(12) United States Patent
Chang et al.

(10) Patent No.: US 8,627,235 B2
(45) Date of Patent: Jan. 7, 2014

(54) MOBILE TERMINAL AND CORRESPONDING METHOD FOR ASSIGNING USER-DRAWN INPUT GESTURES TO FUNCTIONS

(75) Inventors: Jin A. Chang, Seoul (KR); Kyung Lack Kim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 557 days.

(21) Appl. No.: 12/704,371

(22) Filed: Feb. 11, 2010

(65) Prior Publication Data

US 2010/0315358 A1    Dec. 16, 2010

(30) Foreign Application Priority Data

Jun. 12, 2009   (KR) .................. 10-2009-0052266

(51) Int. Cl.
*G06F 3/033* (2013.01)
*G06F 3/041* (2006.01)

(52) U.S. Cl.
USPC ......................... 715/863; 345/173; 345/179

(58) Field of Classification Search
USPC .................... 715/863; 345/156, 179
See application file for complete search history.

(56) References Cited

U.S. PATENT DOCUMENTS

| 5,347,295 | A | * | 9/1994 | Agulnick et al. | 345/156 |
| 5,481,278 | A | * | 1/1996 | Shigematsu et al. | 345/179 |
| 5,596,697 | A | * | 1/1997 | Foster et al. | 715/810 |
| 6,031,533 | A | * | 2/2000 | Peddada et al. | 715/733 |
| 6,971,067 | B1 | * | 11/2005 | Karson et al. | 715/777 |
| 2006/0242607 | A1 | * | 10/2006 | Hudson | 715/863 |
| 2007/0177804 | A1 | * | 8/2007 | Elias et al. | 382/188 |
| 2009/0113355 | A1 | * | 4/2009 | Koo | 715/863 |
| 2010/0251189 | A1 | * | 9/2010 | Jaeger | 715/863 |

FOREIGN PATENT DOCUMENTS

| CN | 101339487 A | 1/2009 |
| KR | 10-0317690 B1 | 12/2001 |
| KR | 10-2006-0116112 A | 11/2006 |
| KR | 10-2008-0080871 A | 9/2008 |
| KR | 10-2009-0013432 A | 2/2009 |

* cited by examiner

*Primary Examiner* — Doug Hutton, Jr.
*Assistant Examiner* — Li Sun
(74) *Attorney, Agent, or Firm* — Birch, Stewart, Kolasch & Birch, LLP

(57) ABSTRACT

A method of controlling a mobile terminal, the method including displaying, via a controller, at least one first function icon on a touchscreen of the mobile terminal, assigning, via the controller, a first input gesture to the displayed first function icon such that a first function corresponding to the first function icon is executed when the first input gesture is performed on the mobile terminal, and removing, via the controller, the first function icon from the touchscreen of the mobile terminal after the first gesture has been assigned to the first function icon.

18 Claims, 11 Drawing Sheets

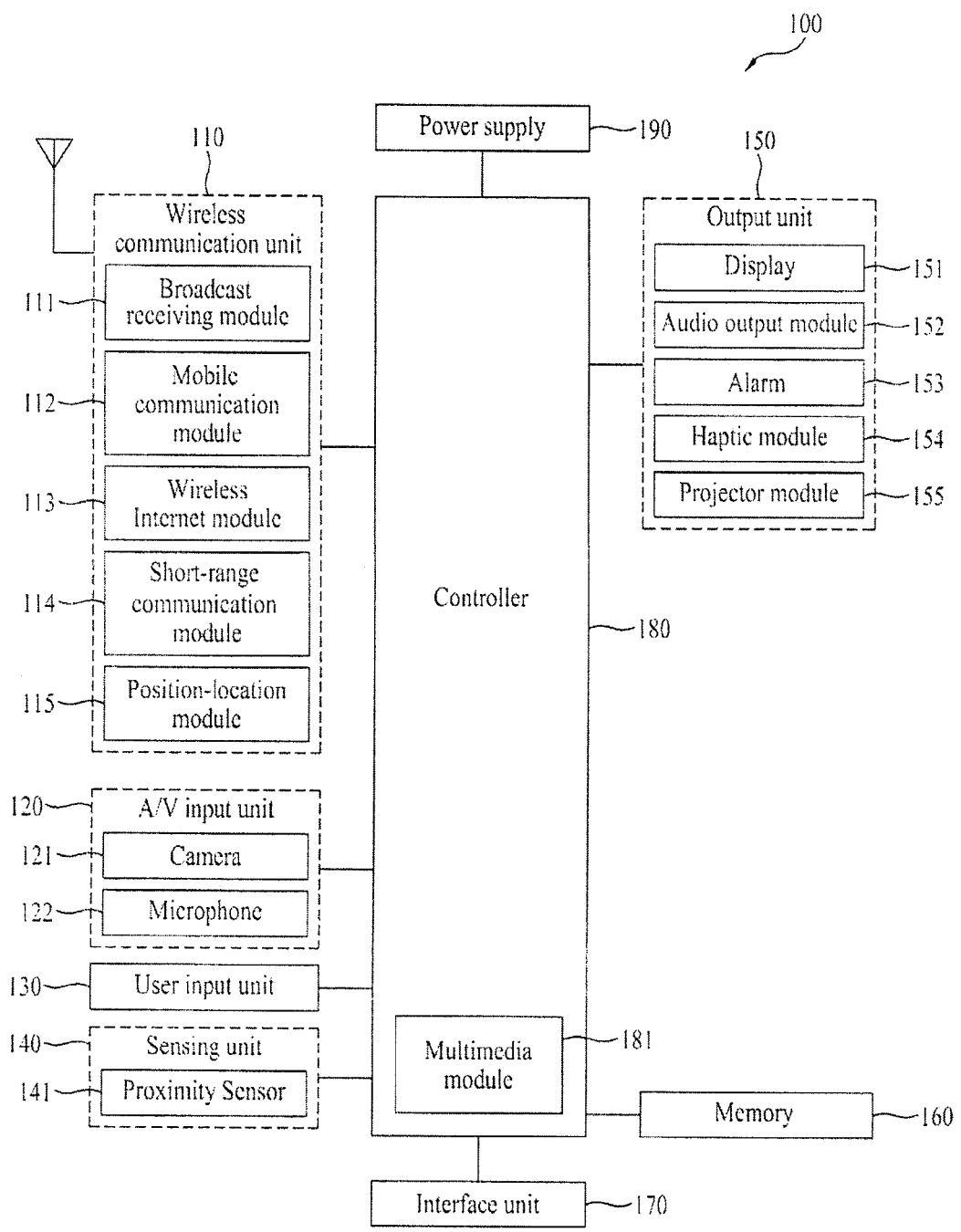

FIG. 6
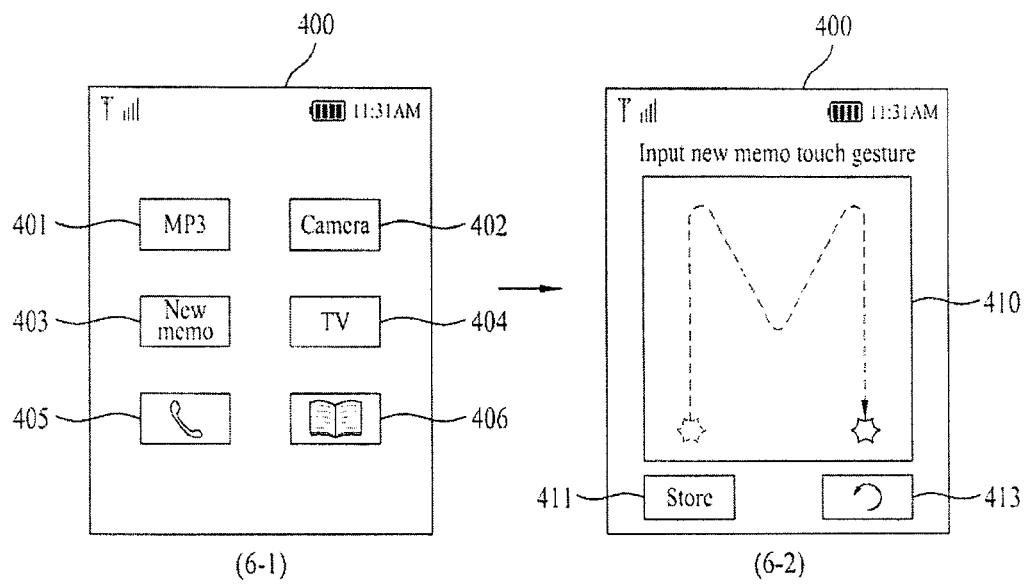
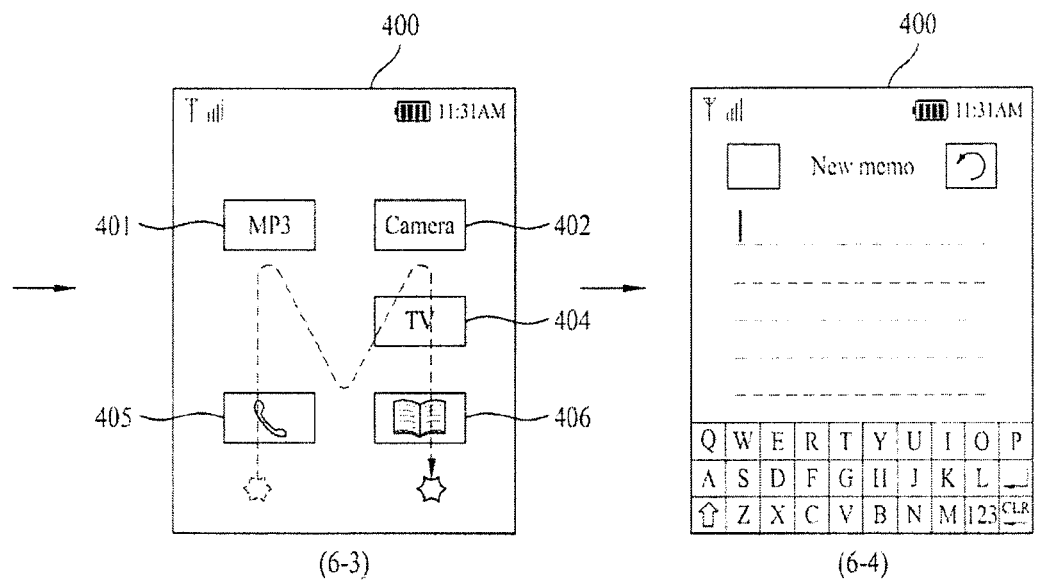

MOBILE TERMINAL AND CORRESPONDING METHOD FOR ASSIGNING USER-DRAWN INPUT GESTURES TO FUNCTIONS

Pursuant to 35 U.S.C. §119(a), this application claims the benefit of earlier filing date and right of priority to Korean Application No. 10-2009-0052266, filed on Jun. 12, 2009, the contents of which are hereby incorporated by reference herein in their entirety.

BACKGROUND OF THE INVENTION

1. Field of the Invention

The present invention relates to a mobile terminal and corresponding method of controlling the mobile terminal.

2. Discussion of the Related Art

Mobile terminals now provide many additional functions besides the basic call function. For example, a mobile terminal allows a user to capture images and video via a camera, record audio, play music files, play games etc. Terminals can also receive broadcast and multicast signals which permit viewing of contents, such as videos and television programs.

However, because the mobile terminals are relatively small in size, the display is also small in size, which makes it difficult to display the various information included with the many functions provide by the mobile terminal.

SUMMARY OF THE INVENTION

Accordingly, one object of the present invention is to provide a mobile terminal and corresponding controlling method that substantially obviate one or more problems due to limitations and disadvantages of the related art.

Another object of the present invention is to provide a mobile terminal and corresponding controlling method that allows diverse functions to be selected and executed without displaying corresponding execution icons on a display of the terminal.

To achieve these objects and other advantages and in accordance with the purpose of the invention, as embodied and broadly described herein, the present invention provides in one aspect, a method of controlling a mobile terminal, the method including displaying, via a controller, at least one first function icon on a touchscreen of the mobile terminal, assigning, via the controller, a first input gesture to the displayed first function icon such that a first function corresponding to the first function icon is executed when the first input gesture is performed on the mobile terminal, and removing, via the controller, the first function icon from the touchscreen of the mobile terminal after the first gesture has been assigned to the first function icon.

In another aspect, the present invention provides a mobile terminal including a controller configured to display at least one first function icon on a touchscreen of the mobile terminal, and an input unit configured to receive a first input gesture performed with respect to the mobile terminal, the controller is further configured to assign the input first gesture to the displayed first function icon such that a first function corresponding to the first function icon is executed when the first input gesture is performed on the mobile terminal, and to remove the first function icon from the touchscreen of the mobile terminal after the first gesture has been assigned to the first function icon.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram of a mobile terminal according to one embodiment of the present invention;

FIGS. 6 to 12 are overviews of display screens illustrating different methods of controlling a mobile terminal according to embodiments of the present invention.

DETAILED DESCRIPTION OF THE INVENTION

Figure 2A:
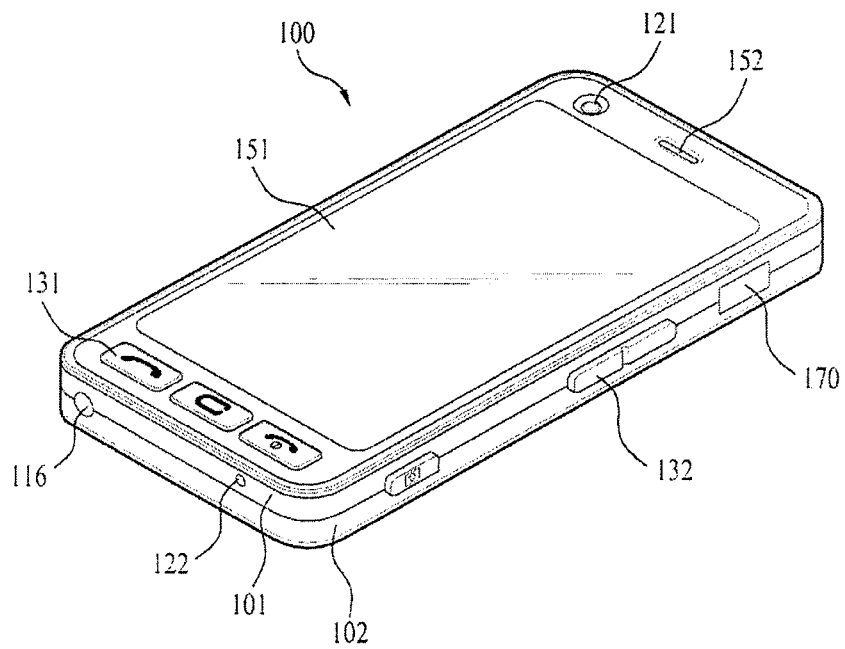
FIG. 2A is a front perspective diagram of a mobile terminal according to one embodiment of the present invention.

Hereinafter, a mobile terminal relating to embodiments of the present invention will be described below in more detail with reference to the accompanying drawings. Further, the mobile terminal described in the specification can include a cellular phone, a smart phone, a laptop computer, a digital broadcasting terminal, personal digital assistants (PDA), a portable multimedia player (PMP), a navigation system and so on.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180 and a power supply 190. Not all of the components shown in FIG. 1 are essential parts and the number of components included in the mobile terminal can be varied.

In addition, the radio communication unit 110 includes at least one module that enables radio communication between the mobile terminal 100 and a radio communication system or between the mobile terminal 100 and a network in which the mobile terminal 100 is located. For example, in FIG. 1, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Further, the broadcasting channel can include a satellite channel and a terrestrial channel. Also, the broadcasting management server can be a server that generates and transmits broadcasting signals and/or broadcasting related information, or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals, but also signals in the form of a combination of a TV broadcasting signal and a radio broadcasting signal.

In addition, the broadcasting related information can be information on a broadcasting channel, a broadcasting program or a broadcasting service provider. The broadcasting related information can be provided even through a mobile communication network. In this instance, the broadcasting related information can be received by the mobile communication module 112. The broadcasting related information can also exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. In particular, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, and the DVB-H and integrated services digital broadcast-terrestrial (ISDB-T) system. The broadcasting receiving module 111 can also be constructed to be suited to broadcasting systems providing broadcasting signals other than the above-described digital broadcasting systems. The broadcasting signals and/or broadcasting related information received through the broadcasting receiving module 111 can also be stored in the memory 160.

Further, the mobile communication module 112 transmits/receives a radio signal to/from at least one of a base station, an external terminal, and a server on a mobile communication network. The radio signal can include a voice call signal, a video telephony call signal or data in various forms according to transmission and receiving of text/multimedia messages. The wireless Internet module 113 corresponds to a module for wireless Internet access and can be included in the mobile terminal 100 or externally attached to the mobile terminal 100. Wireless LAN (WLAN) (Wi-Fi), wireless broadband (Wibro), world interoperability for microwave access (WIMAX), high speed downlink packet access (HSDPA) and so on can be used as a wireless Internet technique. The local area communication module 114 corresponds to a module for local area communication. BLUETOOTH, Radio Frequency Identification (RFID), infrared data association (IrDA), ultra wideband (UWB) and ZigBee can be used as a local area communication technique.

In addition, the position information module 115 confirms or obtains the position of the mobile terminal 100. A global positioning system (GPS) module is a representative example of the position information module 115. Further, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude coordinates at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. The processed image frames can be displayed on a display 151 included in the output unit 150. In addition, the image frames processed by the camera 121 can be stored in the memory 160 or transmitted to an external device through the radio communication unit 110. The mobile terminal 100 can also include at least two cameras.

Further, the microphone 122 receives an external audio signal in a call mode, a recording mode or a speed recognition mode and processes the received audio signal into electric audio data. The audio data can also be converted into a form that can be transmitted to a mobile communication base station through the mobile communication module 112 and output in the call mode. The microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on. The sensing unit 140 senses the current state of the mobile terminal 100 such as an open/close state of the mobile terminal 100, the position of the mobile terminal 100, whether a user touches the mobile terminal 100, the direction of the mobile terminal 100 and acceleration/deceleration of the mobile terminal 100 and generates a detection signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor 141.

In addition, the output unit 150 generates visual, auditory or tactile output and in FIG. 1 includes the display 151, an audio output module 152, an alarm 153, a haptic module 154 and a projector module 155. The display 151 displays information processed by the mobile terminal 100. For example, the display 151 displays a UI or graphic user interface (GUI) related to a telephone call when the mobile terminal is in the call mode. The display 151 also displays a captured or/and received image, UI or GUI when the mobile terminal 100 is in the video telephony mode or the photographing mode.

The display 151 can also include at least one of a liquid crystal display, a thin film transistor liquid crystal display, an organic light-emitting diode display, a flexible display and a three-dimensional display. Some of these displays can be of a transparent type or a light transmission type, which is referred to as a transparent display. The transparent display also includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display 151.

Further, the mobile terminal 100 can include at least two displays 151. For example, the mobile terminal 100 can include a plurality of displays that are arranged on a single face at a predetermined distance or integrated. Otherwise, the plurality of displays can be arranged on different sides. In addition, when the display 151 and a sensor sensing touch (referred to as a touch sensor hereinafter) form a layered structure, which is referred to as a touch screen hereinafter, the display 151 can be used as an input device in addition to an output device. The touch sensor can be in the form of a touch film, a touch sheet and a touch pad, for example.

Also, the touch sensor can be constructed such that it converts a variation in pressure applied to a specific portion of the display 151 or a variation in capacitance generated at a specific portion of the display 151 into an electric input signal. The touch sensor can also be constructed such that it can sense pressure of touch as well as the position and area of touch. When touch input is applied to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal 100, surrounded by the touch screen or near the touch screen. The proximity sensor 141 senses an object approaching a predetermined sensing face or an object located near the proximity sensor 141 using an electromagnetic force or infrared rays without having mechanical contact. Further, the proximity sensor 141 has a lifetime longer than that of a contact sensor and has wide applications. The proximity sensor 141 also includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

In addition, a capacitive touch screen is constructed such that a proximity of a pointer is detected through a variation in an electric field according to the proximity of the pointer. In this instance, the touch screen (touch sensor) can be classified as a proximity sensor. For convenience of explanation, an action of approaching the pointer to the touch screen while the pointer is not in contact with the touch screen such that the location of the pointer on the touch screen is recognized is referred to as a "proximity touch," and an action of bringing the pointer into contact with the touch screen is referred to as a "contact touch" in the following description. Also, a proximity touch point of the pointer on the touch screen means a point of the touch screen to which the pointer corresponds perpendicularly to the touch screen when the pointer proximity-touches the touch screen.

Further, the proximity sensor 141 senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can also be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. The audio output module 152 also outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating a generation of an event of the mobile terminal 100. Examples of events generated in the mobile terminal 100 include receiving a call signal, receiving a message, inputting a key signal, inputting touch, etc. The alarm 153 can also output signals in forms different from video signals or audio signals, for example, a signal for indicating a generation of an event through vibration. The video signals or the audio signals can also be output through the display unit 151 or the audio output module 152.

In addition, the haptic module 154 generates various haptic effects that the user can feel. A representative example of the haptic effects is vibration. The intensity and pattern of vibration generated by the haptic module 154 can also be controlled. For example, different vibrations can be combined and output or sequentially output. The haptic module 154 can also generate a variety of haptic effects including an effect of stimulus according to an arrangement of pins vertically moving for a contact skin face, an effect of stimulus according to a jet force or sucking force of air through a jet hole or a sucking hole, an effect of stimulus of rubbing the skin, an effect of stimulus according to contact of an electrode, an effect of stimulus using an electrostatic force and an effect according to reproduction of cold and warmth using an element capable of absorbing or radiating heat in addition to vibrations. Further, the haptic module 154 can not only transmit haptic effects through direct contact, but also allow the user to feel haptic effects through kinesthetic sense of his or her fingers or arms. The mobile terminal 100 can also include at least two or more haptic modules 154.

The projector module 155 is an element for performing an image projector function using the mobile terminal 100. That is, the projector module 155 can display an image, which is identical to or partially different at least from the image displayed on the display 151, on an external surface such as a wall or screen according to a control signal of the controller 180. In particular, the projector module 155 includes a light source generating light (e.g., laser) for projecting an image, an image producing unit for producing an image to be projected using the light generated from the light source, and a lens for enlarging the image to be projected in a predetermined focus distance. In addition, the projector module 155 can include an adjustment device for adjusting an image projected direction by mechanically moving the lens or the whole module.

Further, the projector module 155 can be classified into a CRT (cathode ray tube) module, an LCD (liquid crystal display) module, a DLP (digital light processing) module or the like according to a device type of a display mechanism. In particular, the DLP module is operated by the mechanism of enabling the light generated from the light source to reflect on a DMD (digital micro-mirror device) chip and can be advantageous for the downsizing of the projector module 151. Preferably, the projector module 155 can be provided in a length direction of a lateral, front or backside direction of the mobile terminal 100. The projector module 155 can also be provided to any portion of the mobile terminal 100.

In addition, the memory 160 stores a program for the operation of the controller 180 and temporarily stores input/output data (for example, a phone book, messages, still images, moving images, etc.). The memory 160 can also store data about vibrations and sounds in various patterns, which are output when a touch input is applied to the touch screen. The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

Further, the interface 170 serves as a path to external devices connected to the mobile terminal 100. The interface 170 receives data or power from the external devices and transmits the data or power to the internal components of the mobile terminal 100 or transmits data of the mobile terminal 100 to the external devices. The interface 170 can also include a wired/wireless headset port, an external charger port, a wired/wireless data port, a memory card port, a port for connecting a device having a user identification module, an audio I/O port, a video I/O port, an earphone port, etc., for example.

In addition, an identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

Also, the interface 170 can serve as a path through which power from an external cradle is provided to the mobile terminal 100 when the mobile terminal 100 is connected to the external cradle, or a path through which various command signals input by the user through the cradle to the mobile terminal 100. The various command signals or power input from the cradle can also be used as a signal for confirming whether the mobile terminal 100 is correctly set in the cradle.

The controller 180 controls the overall operation of the mobile terminal. For example, the controller 180 performs control and processing for voice communication, data communication and video telephony. In FIG. 1, the controller 180 includes a multimedia module 181 for playing multimedia. The multimedia module 181 can be included in the controller 180 or separated from the controller 180. Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Further, various embodiments of the present invention can be implemented in a computer or similar device readable recording medium using software, hardware or a combination thereof, for example. According to a hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electrical units for executing functions. The embodiments can also be implemented by the controller 180.

According to a software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Next, FIG. 2A is a front perspective view of a mobile terminal or a handheld terminal 100 according to an embodiment of the present invention. As shown, the mobile terminal 100 is a bar type terminal body. However, the present invention is not limited to a bar type terminal and can be applied to terminals of various types including a slide type, folder type, swing type and swivel type terminals having at least two bodies that are relatively movably combined.

In addition, the terminal body includes a case (a casing, a housing, a cover, etc.) forming the exterior of the terminal 100. In the present embodiment, the case is divided into a front case 101 and a rear case 102. Various electronic components are also arranged in the space formed between the front case 101 and the rear case 102. At least one middle case can be additionally arranged between the front case 101 and the rear case 102. The cases can also be formed of plastics through injection molding or be made of a metal material such as stainless steel (STS) or titanium (Ti).

In addition, the display 151, the audio output unit 152, the camera 121, user input units 131 and 132 of the user input unit 130 (FIG. 1), the microphone 122 and the interface 170 are arranged in the terminal body, specifically, in the front case 101. Also, in FIG. 1, the display 151 occupies most part of the main face of the front case 101. The audio output unit 152 and the camera 121 are arranged in a region in proximity to one of both ends of the display 151 and the user input unit 131 and the microphone 122 are located in a region in proximity to the other end of the display 151. In addition, the user input unit 132 and the interface 170 are arranged on the sides of the front case 101 and the rear case 102.

Further, the user input unit 130 is operated to receive commands for controlling the operation of the handheld terminal 100 and can include the operating units 131 and 132. The operating units 131 and 132 can be referred to as manipulating portions and employ any tactile manner in which a user operates the operating units 131 and 132 while having tactile feeling. The operating units 131 and 132 can also receive various inputs. For example, the operating unit 131 receives commands such as start, end and scroll, and the second operating unit 132 receives commands such as control of the volume of sound output from the audio output unit 152 or conversion of the display 151 to a touch recognition mode.

Figure 2B:
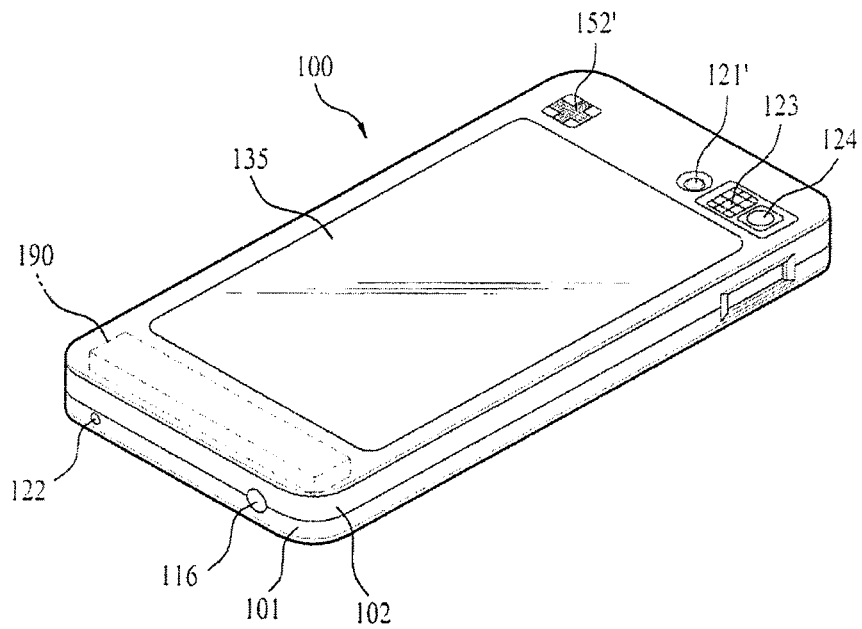
FIG. 2B is a rear perspective diagram of a mobile terminal according to one embodiment of the present invention.

Next, FIG. 2B is a rear perspective view of the mobile terminal 100 shown in FIG. 2A according to an embodiment of the present invention. Referring to FIG. 2B, a camera 121' is additionally attached to the rear side of the terminal body, that is, the rear case 102. The camera 121' has a photographing direction opposite to that of the camera 121 shown in FIG. 2A and can have pixels different from those of the camera 121 shown in FIG. 2A. For example, it is preferable that the camera 121 has low pixels such that it can capture an image of the face of a user and transmit the image to a receiving part for video telephony, while the camera 121' has high pixels because it captures an image of a general object and does not immediately transmit the image in many instances. The cameras 121 and 121' can also be attached to the terminal body such that they can be rotated or popped-up.

A flash bulb 123 and a mirror 124 are also arranged in proximity to the camera 121'. The flash bulb 123 lights an object when the camera 121' takes a picture of the object, and the mirror 124 is used for the user to look at his/her face in the mirror when the user wants to self-photograph himself/herself using the camera 121'. An audio output unit 152' is also provided on the rear side of the terminal body. The audio output unit 152' can thus achieve a stereo function with the audio output unit 152 shown in FIG. 2A and be used for a speaker phone mode when the terminal is used for a telephone call.

A broadcasting signal receiving antenna 124 is also attached to the side of the terminal body in addition to an antenna for telephone calls. The antenna 124 constructing a part of the broadcasting receiving module 111 shown in FIG.

1 can be set in the terminal body such that the antenna 124 can be retracted from the terminal body. Further, the power supply 190 for providing power to the handheld terminal 100 is set in the terminal body. The power supply 190 can be included in the terminal body or detachably attached to the terminal body. A touch pad 135 for sensing touch is also attached to the rear case 102. The touch pad 135 can be of a light transmission type as the display 151. In this instance, if the display 151 outputs visual information through both sides thereof, the visual information can be recognized through the touch pad 135. The information output through both sides of the display 151 can also be controlled by the touch pad 135. Otherwise, a display is additionally attached to the touch pad 135 such that a touch screen can be arranged even in the rear case 102.

The touch pad 135 also operates in connection with the display 151 of the front case 101. The touch pad 135 can be located in parallel with the display 151 behind the display 151, and can be identical to or smaller than the display 151 in size.

The proximity sensor described with reference to FIG. 1 will now be explained in more detail with reference to FIG. 3. That is, FIG. 3 is a conceptual diagram used for explaining a proximity depth of the proximity sensor 141.

Figure 3:
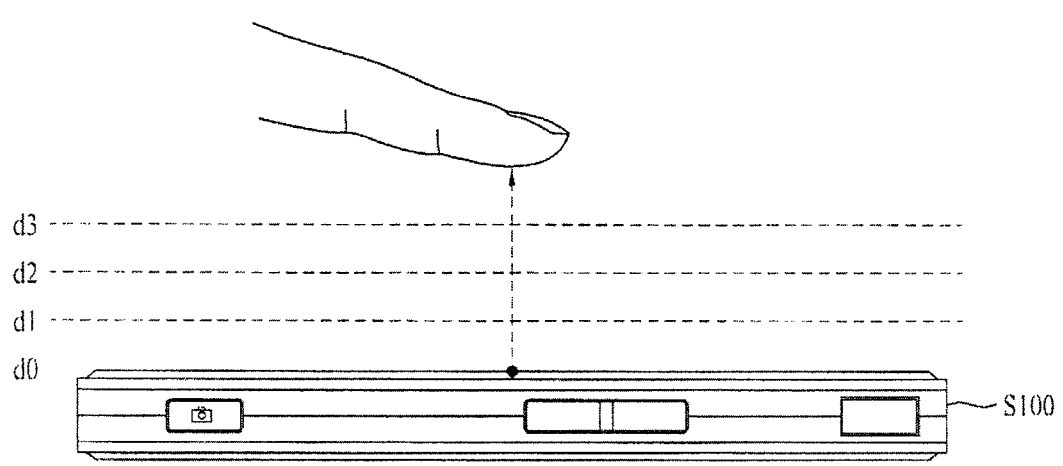
FIG. 3 is a diagram for explaining a concept of proximity depth of a proximity sensor.

As shown in FIG. 3, when a pointer such as a user's finger approaches the touch screen, the proximity sensor 141 located inside or near the touch screen senses the approach and outputs a proximity signal. Further, the proximity sensor 141 can be constructed such that it outputs a proximity signal according to the distance between the pointer approaching the touch screen and the touch screen (referred to as "proximity depth").

Also, the distance in which the proximity signal is output when the pointer approaches the touch screen is referred to as a detection distance. The proximity depth can be determined using a plurality of proximity sensors having different detection distances and comparing proximity signals respectively output from the proximity sensors.

FIG. 3 shows the section of the touch screen in which proximity sensors capable of sensing three proximity depths are arranged. Of course, proximity sensors capable of sensing less than three or more than three proximity depths can be arranged in the touch screen.

Thus, as shown in FIG. 3, when the pointer (user's finger in this example) completely comes into contact with the touch screen (D0), the controller 180 recognizes this action as the contact touch. When the pointer is located within a distance D1 from the touch screen, the controller 180 recognizes this action as a proximity touch of a first proximity depth.

Similarly, when the pointer is located in a range between the distance D1 and a distance D2 from the touch screen, the controller 180 recognizes this action as a proximity touch of a second proximity depth. When the pointer is located in a range between the distance D2 and a distance D3 from the touch screen, the controller 180 recognizes this action a proximity touch of a third proximity depth. Also, when the pointer is located at longer than the distance D3 from the touch screen, the controller 180 recognizes this action as a cancellation of proximity touch.

Accordingly, the controller 180 can recognize the proximity touch as various input signals according to the proximity distance and proximity position of the pointer with respect to the touch screen and perform various operations according to the input signals.

Figure 4A:
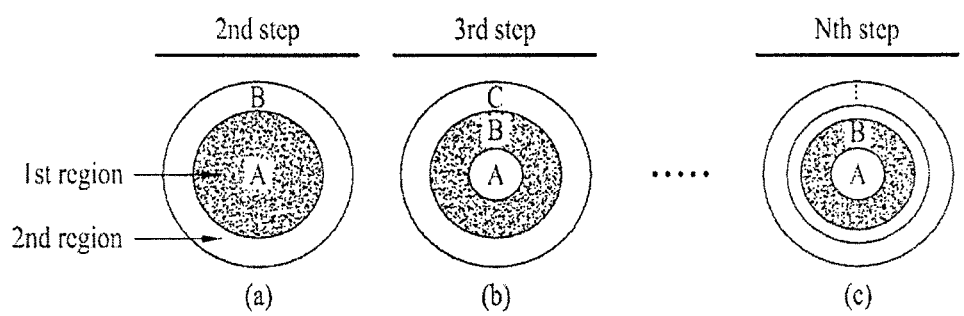
FIG. 4A and FIG. 4B are diagrams for explaining a proximity touch recognizing area for detecting a proximity signal and a haptic area for generating a tactile effect, respectively.
Figure 4B:
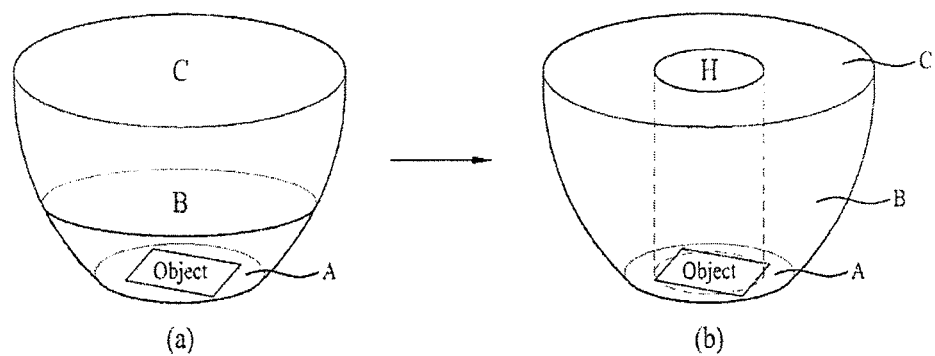

Next, FIGS. 4A and 4B are diagrams for describing a proximity touch recognition area and a tactile effect generation region according to an embodiment of the present invention. In particular, FIG. 4A represents an object such as an icon, a menu item and the like in a circle type for clarity and convenience of explanation.

As shown in FIG. 4A(a), the region for displaying an object on the display 151 can be divided into a first region A at a central part and a second region B enclosing the first region A. Further, the first and second regions A and B can be configured to generate tactile effects differing from each other in strength or pattern. For instance, the first and second regions can be configured to generate 2-step vibrations by outputting a first vibration if the second region B is touched and by outputting a second vibration greater than the first vibration if the first region A is touched.

Also, the haptic region can be different from the proximity touch recognition region. In particular, the haptic region can be set to be narrower or wider than the proximity touch recognition region. For instance, in FIG. 4A(a), the proximity touch recognition region can be set to include both of the first and second regions A and B, and the haptic region can be set to include only the first region A.

Further, as shown in FIG. 4A(b), the region having the object displayed therein can be discriminated into three regions A, B and C. Alternatively, as shown in FIG. 4A(c), the region having the object displayed therein can be discriminated into N regions (N>3). Each of the divided regions can also be set to generate a tactile effect having a different strength or pattern. Further, as discussed above, a region having a single object can be divided into at least three regions, and in which the haptic region and the proximity touch recognition region are set to differ from each other.

Next, FIG. 4B illustrates configuring a size of the proximity touch recognition region of the display 151 to vary according to a proximity depth. In particular, referring to FIG. 4B(a), the proximity touch recognition region is configured to decrease by C→B→A according to the proximity depth for the display 151, and configured to increase by C→B→A according to the proximity depth for the display 151. Further, the haptic region can be set to have a predetermined size, as the region 'H' shown in FIG. 4B(b), regardless of the proximity depth for the display 151.

Also, when dividing the object-displayed region for the setting of the haptic region or the proximity touch recognition region, various schemes of horizontal/vertical division, radial division and combinations thereof can be used as well as the concentric circle type division shown in FIG. 4A.

The following description of the embodiments assumes the display 151 includes a touchscreen. The display screen of the touchscreen 151 will also be indicated by a reference number 400.

Figure 5:
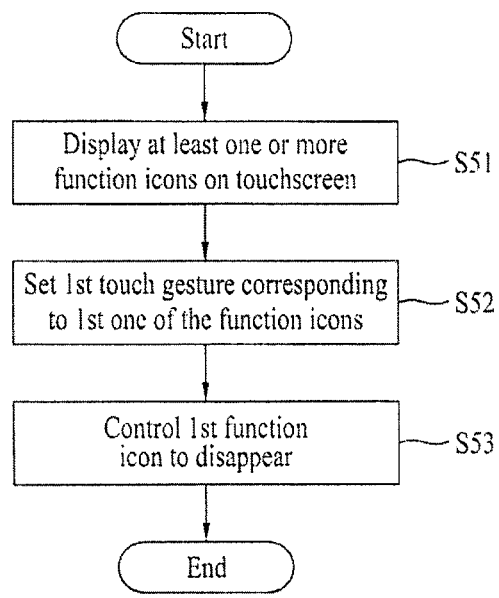
FIG. 5 is a flowchart illustrating a method of controlling a mobile terminal according to one embodiment of the present invention.

Turning now to FIG. 5, which is a flowchart illustrating a method of controlling a mobile terminal according to one embodiment of the present invention. As shown in FIG. 5, the controller 180 displays at least one function icon on the touchscreen 400 (S51). The user then sets a particular touch gesture to correspond to a particular icon displayed on the touchscreen 400 (S52). Then, the controller 180 removes the particular icon from the display 151 when the user sets the particular touch gesture on the touchscreen 400 (S53).

These features will now be described in more detail with respect to FIGS. 6 to 12. In more detail, as shown in FIG. 6 (6-1), the mobile terminal 100 is in a standby mode in which a plurality of function icons 401-406 are displayed (i.e., a standby screen is displayed). Also, if the user touches any one of the icons 401-406 in the standby mode, the particular function is executed.

Thus, the displayed icons will be referred to as function icons. Further, when a prescribed menu icon (e.g., MP3 menu icon) is executed, a displayed icon such as a play icon, stop icon, etc. related to the prescribed menu will also be referred to as function icon.

In addition, in FIGS. 6(6-1) and (6-2), the user sets a touch gesture for the 'new memo' icon 403 (hereinafter referred to as 'a first menu icon'). The icon 403 is only being used as an example and any other function icon can be selected. Further, a touch gesture setting mode is first entered to set the touch gesture for the first menu icon 403. In more detail, the touch gesture setting mode can be entered in several different ways such as by performing a long-touch operation on the first menu icon 403 (i.e., touching the icon 403 for an amount of time longer than a predetermined time). A double touch operation can also be used. In another example, the user can manipulate a physical key included with the user input unit 130 (e.g., a side key, a push key located below the touch-screen, etc.).

Then, when the user enters the touch gesture setting mode, and as shown in FIG. 6(6-2), the controller 180 displays a touch gesture input window 410 on the touch screen 400 that the user can use for inputting a prescribed gesture that is to be set for the first menu icon 403. The displayed window 410 also includes a storage icon 411 for storing the input prescribed touch gesture and a return icon 413 for returning to the standby image.

The user then inputs a prescribed touch gesture (hereinafter referred to as 'a first touch gesture') for the first menu icon 403 to the touch gesture input window 410. The first touch gesture can be input by performing a proximity/contact touch and then performing a touch & drag operation along a trace of a first shape (e.g., 'M' shape in this example) on the first touch gesture input window 410. As shown in FIG. 6(6-2), the controller 180 also displays a trace of the touch & drag operation on the touch gesture input window 410.

Then, if the user is satisfied with the drawn gesture, the user can select (e.g., touch, manipulation of a physical key, etc.) the storage icon 411 to save the first touch gesture for the first menu icon 403 in the memory 160. That is, the first touch gesture is stored in the memory 160 in association with the first menu icon 403. Therefore, the user can set a plurality of gestures for a plurality of function icons.

Referring to FIG. 6(6-3), the mobile terminal 100 returns to the standby mode and displays the standby screen on the touchscreen 400. However, the controller 180 does not display the first menu icon 403. Then, if the user wants to execute the first menu icon 403, the user can simply perform the preset first touch gesture (draw the letter M as shown in FIG. 6(6-3)). Then, referring to FIG. 6(6-4), the controller 180 executes the function corresponding to the first menu icon 403. That is, the controller 180 displays a 'new memo' menu corresponding to the function for the first menu icon 403.

Figure 7:
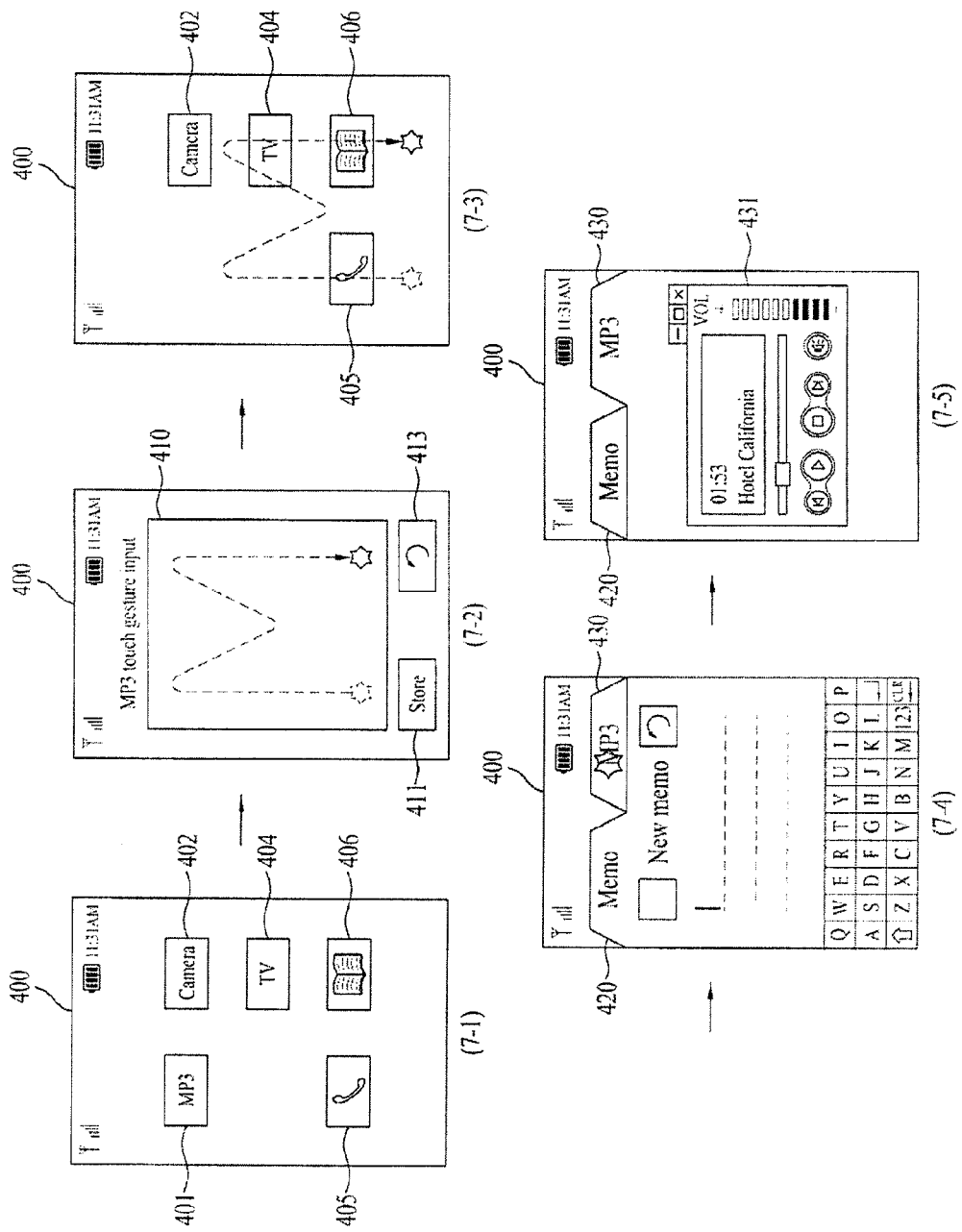

Next, FIG. 7 illustrates an embodiment in which two functions are executed based on a single touch gesture. In more detail, as shown in FIG. 7(7-1), the mobile terminal 100 is a standby mode and the standby screen is displayed on the touchscreen 400. Also, as discussed above, because the user has set the first touch gesture for the first menu icon 403, the controller 180 does not display the first menu icon 403 as shown in FIG. 7(7-1). The user also then enters the touch gesture setting mode using a variety of different ways as discussed above, and the controller 180 displays the touch gesture input window 410 on the touchscreen 400 as shown in FIG. 7(7-2). Then, the user sets the same touch gesture for the 'MP3' menu icon 401 (hereinafter named 'a second menu icon') as shown in FIG. 7(7-2).

Subsequently, the user selects the storage icon 411, and the controller 180 stores the first touch gesture for the second menu icon 401 in the memory 160. Thus, the same touch gesture is assigned or set to two different function icons (or functions). In addition, the controller 180 can also first display a guide window to help guide the user in correctly redrawing the first touch gesture such that the touch gestures are identical or similar to each other. The controller 180 can also display a prompt informing the user that the first touch gesture for the second menu icon 401 will be stored, and indicate the two touch gestures are identical to each other. If the user confirms the touch gesture is to be linked to two function icons, the controller 180 stores the first touch gesture for the second menu icon 401.

Subsequently, referring FIG. 7(7-3), the mobile terminal 100 returns to the standby mode and displays the standby screen on the touchscreen 400. However, the controller 180 does not display the MP3 icon 401 (or the memo icon 403). Then, when the user performs the first touch gesture on the touchscreen 400 as shown in FIG. 7(7-3), the controller 180 executes both functions (i.e., the 'new memo' menu and the 'MP3' menu functions) as shown in FIG. 7(7-4). That is, the controller 180 displays a 'new memo' executing window 420 and a 'MP3' menu executing window 430 on the touchscreen 400 in an overlapping manner. The controller 180 can also display the two windows as being separate windows, etc.

Then, when the user selects the 'MP3' menu executing window 430, the controller 180 displays the 'MP3' menu executing window 430 to be overlapping the 'new memo' menu executing window 420 as shown in FIG. 7(7-4). The user can then manipulate various functions (e.g., 'play', 'stop', etc.) displayed in a control window 431 associated with the 'MP3' menu execution.

Figure 8:
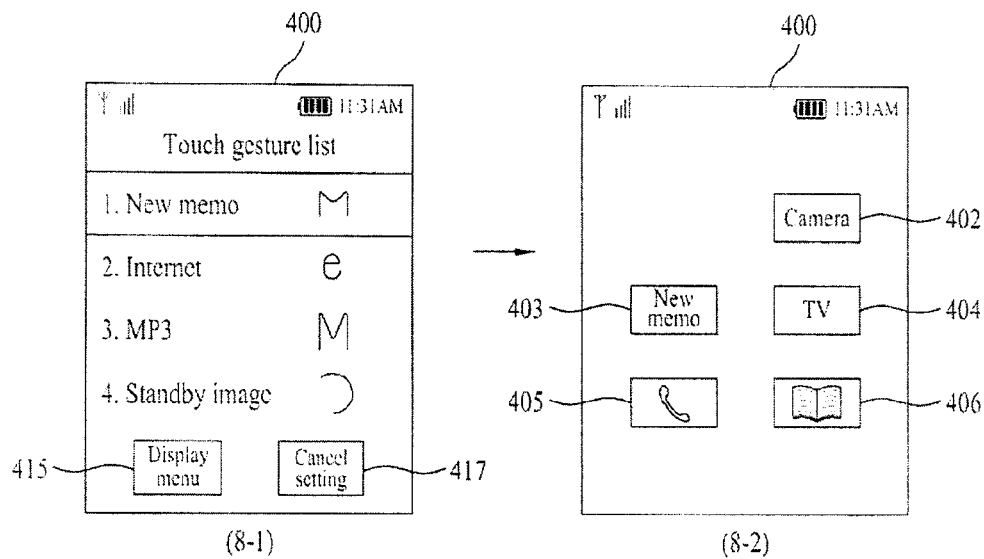

Next, FIG. 8 illustrates displaying a list of touch gestures set in the mobile terminal and re-displaying a menu icon that is not displayed on the standby screen because of the set touch gesture. In particular, as shown FIG. 8(8-1), the user can display a list of touch gestures set in the mobile terminal 100. For example, the user can manipulate a particular key or keys on the user input unit 130 to display the list of touch gestures. The user can also display the list by performing a touch & drag operation and draw an 'L' shape, for example. The user can also set a particular touch gesture to invoke the displaying of the list of touch gestures.

Further, the controller 180 also display a menu display icon 415 that the user can select to re-display a function icon and a setting cancel icon 417 for canceling the setting of the set touch gesture. As shown in FIGS. 8(8-1) and 8(8-2), the user can select one of the displayed list of function icons, and the controller 180 re-displays the touched function icon on the standby screen.

In particular, in the example shown in FIG. 8, the user touches the 'new memo menu' from the touch gesture list, and then selects the menu display icon 415. The controller 180 then re-displays the new memo menu icon 403 on the standby screen as shown in FIG. 8(8-2). Further, the user can cancel the re-displaying of a selection function icon by selecting the setting cancel icon 417.

Figure 9:
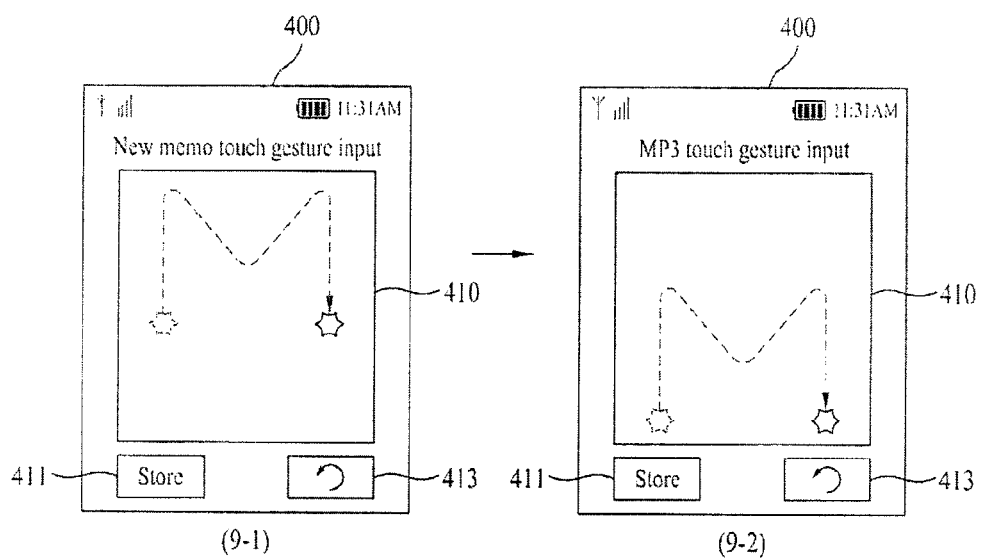
Figure 10:
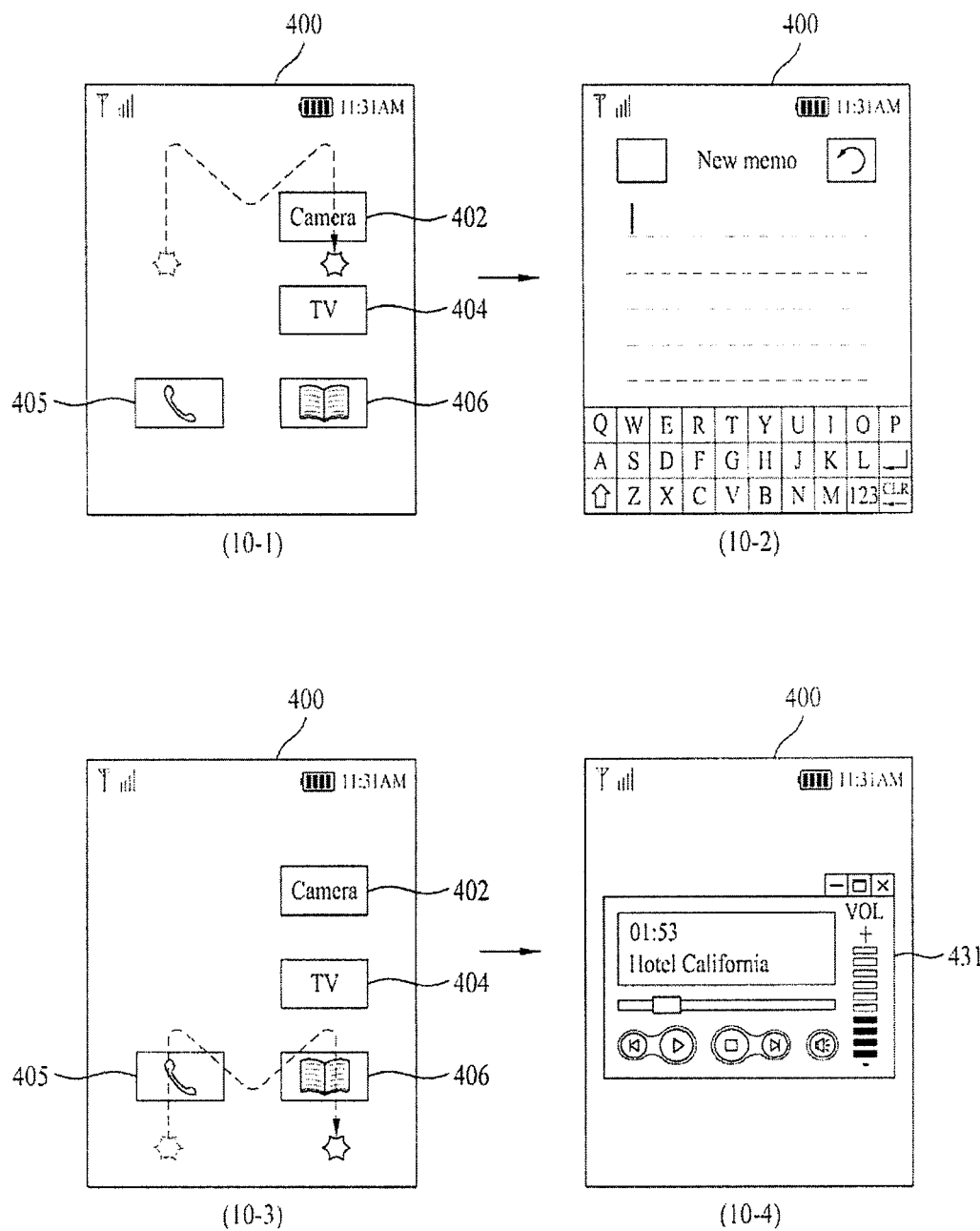

In addition, after the user sets a particular touch gesture, the controller 180 can determine that the same touch gesture has later been input on the touchscreen 400 if the user draws the touch gesture in any portion of the touchscreen 400. In another embodiment, the controller 180 can execute different functions based on where the user draws the touch gesture on the touchscreen 400. That is, the user can set touch gestures for particular portions of the touchscreen 400. Thus, drawing an M shape on the top portion of the touchscreen 400 can correspond to executing the menu icon 403 and drawing the same M shape on the lower portion of the touchscreen 400 can correspond to executing the MP3 function icon 401. FIGS. 9 and 10 illustrate these varying features.

Referring to FIG. 9(9-1), the user enters the touch gesture setting mode and the controller 180 displays the touch gesture input window 410 for a first menu (e.g., 'new memo' menu) is displayed on the touchscreen 400. The user then draws a touch gesture following a trace of a specific shape (e.g., 'M' shape) for the first menu on a top side of the touch gesture input window 410. The user then stores the input touch gesture by selecting the store icon 411.

FIG. 9(9-2) illustrates the user entering the touch gesture input window 410 for a second menu (e.g., 'MP3' menu). The user then draws a touch gesture following a trace of a specific shape (e.g., 'M' shape) for the second menu on a bottom side of the touch gesture input window 410 and stores the input touch gesture. Then, as shown in FIG. 10(10-1), when the user draws the touch gesture having the set shape on the top side of the standby screen, the new memo function is executed. When the user draws the same gesture on the bottom side of the touchscreen 400 as shown in FIG. 10(10-3), the MP3 function is executed as shown FIG. 10(10-4).

Figure 11:
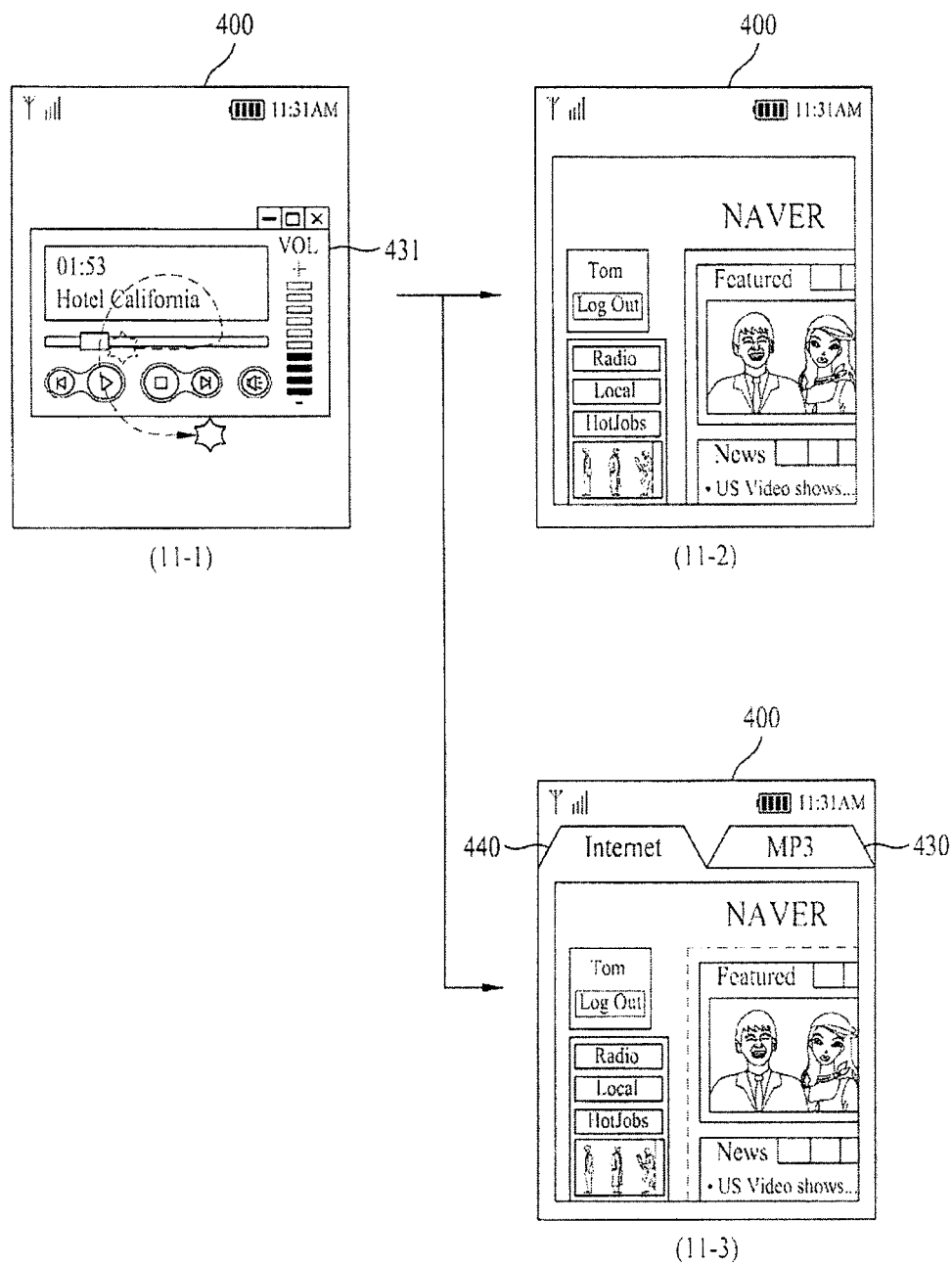

Next, FIG. 11 illustrates the MP3 function currently executing, and then the user drawing a particular touch gesture on the touchscreen 400. In particular, as shown in FIG. 11(11-1), the controller 180 displays the MP3 control window 431 including play, rewind, etc. buttons the user can select to play MP3 files on the mobile terminal.

Then, the user draws a touch gesture corresponding to the Internet function icon, and the controller 180 stops executing the MP3 function and instead executes the Internet function as shown in FIG. 11(11-2). Alternatively, as shown in FIG. 11(11-3), the controller 180 can display the Internet function in an overlapping manner with the MP3 function.

Figure 12:
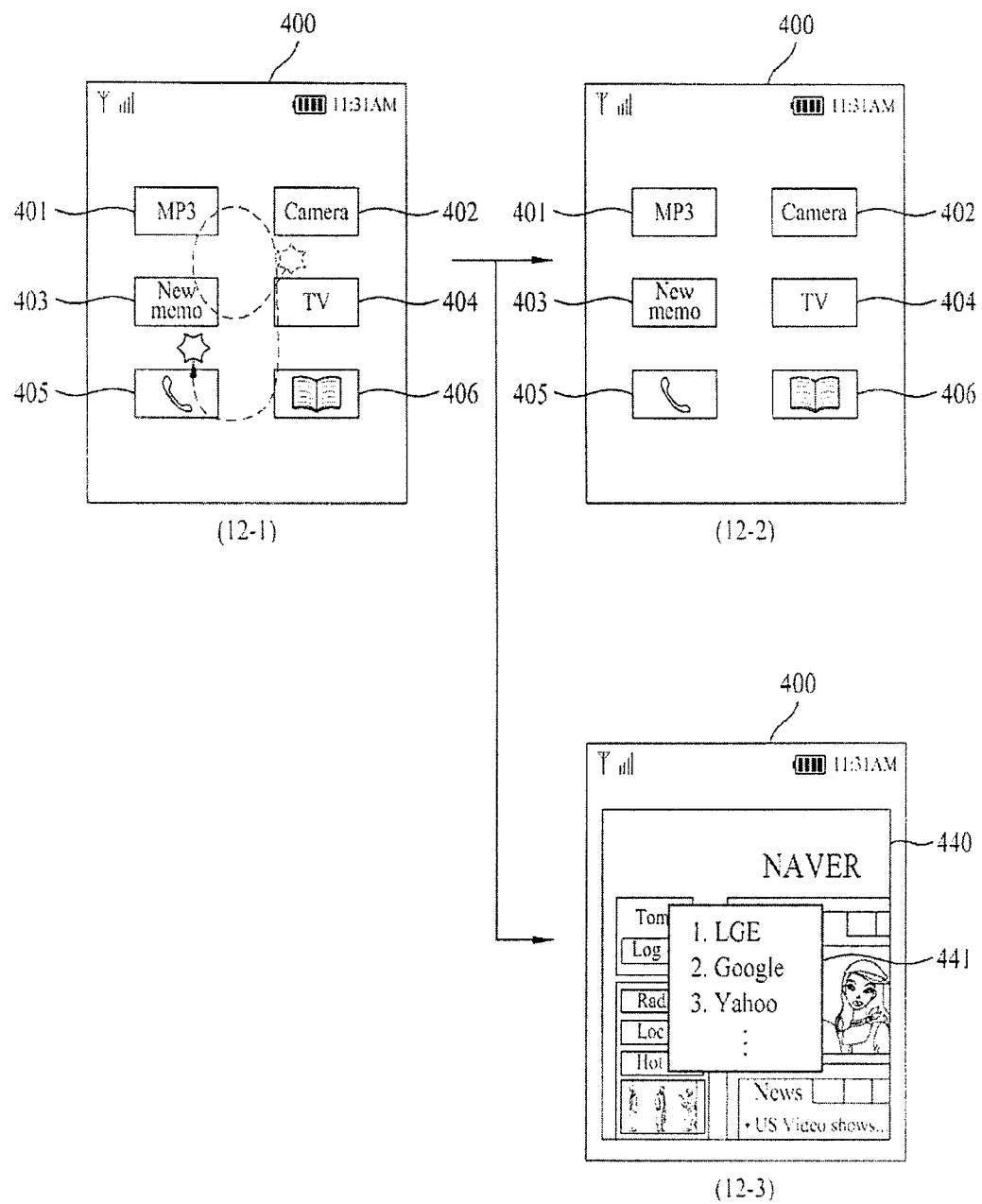

Next, FIG. 12 illustrates the user drawing a particular touch gesture and the corresponding function not being executed because the function is not available on the mobile terminal. In more detail, as shown in FIG. 12(12-1), the user draws the touch gesture according to a trace of 'g' shape, which has been previously set for a 'bookmark' function within the 'Internet' menu, for example.

Then, as shown in FIG. 12(12-2), the controller 180 does not execute the Internet bookmark function. Alternatively, as shown in FIG. 12(12-3), the controller 180 can execute a corresponding Internet browser 440 and display a 'bookmark' associated window 441 on the touchscreen 400 when the particular touch gesture is input and the function is available on the terminal.

Accordingly, the present invention provides several advantages. For example, the terminal display is small in size, yet there are a plurality of function icons available to the user. According to embodiments of the present invention, the user can set particular touch gestures for different function icons such that the limited display area is not cluttered with several icons.

Further, it will be apparent to those skilled in the art that various modifications and variations can be specified into other form(s) without departing from the spirit or scope of the inventions. For instance, the setting of the touch gesture can be set for executing a main menu of the mobile terminal.

Further, the user can also set particular touch gestures to correspond to functions such as a 'memo storage' function, 'memo delete' function, etc. even if such a function does not have a corresponding function icon that is displayed. The function icons can also correspond to a send function in a messaging mode including a text messaging mode, a multimedia messaging mode, an email mode, etc. The touch gesture can also include a letter shape as discussed above or other shapes such as a checkmark, etc.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include Internet) transmission. Further, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, the method comprising:
    displaying, via a controller, at least one first function icon on a standby screen on a touchscreen of the mobile terminal;
    entering a touch gesture setting mode configured to allow a user to input a user-drawn first input gesture that is to be associated with the first function icon;
    assigning, via the controller, the user-drawn first input gesture to the first function icon displayed on the standby screen such that a first function corresponding to the first function icon is to be executed when the user-drawn first input gesture is performed on the standby screen after assigning the user-drawn first input gesture to the first function icon;
    removing, via the controller, the first function icon from the standby screen in response to assigning the user-drawn first input gesture to the first function icon;
    receiving, via the controller, an input gesture on the standby screen;
    executing the first function if the received input gesture on the standby screen matches the user-drawn first input gesture;
    receiving, via an input unit, a canceling signal indicating the cancelation of the assignment of the user-drawn first input gesture to the first function icon;
    canceling the assignment of the user-drawn first input gesture to the first function icon; and
    re-displaying the first function icon on the standby screen in response to the cancelation of the gesture assignment,
    wherein the first function icon is selectively displayed on the touch screen based on whether or not the user-drawn first input gesture is assigned to the first function icon.

2. The method of claim 1, wherein the first function corresponding to the first function icon is a send function in a messaging mode.

3. The method of claim 2, wherein the messaging mode includes one of a text messaging mode, a multimedia messaging mode and an email mode.

4. The method of claim 1, wherein the user-drawn first input gesture corresponds to a check mark motion made on the mobile terminal.

5. The method of claim 1, wherein the user-drawn first input gesture comprises one of a touch and drag operation performed on the touchscreen and a proximity touch action performed close to the mobile terminal without touching the touchscreen.

6. The method of claim 1, further comprising:
assigning, via the controller, the user-drawn first input gesture to a second function icon corresponding to a second function such that both of the first and second functions are executed when the user-drawn first input gesture is performed on the mobile terminal; and
removing, via the controller, the second function icon from the touchscreen of the mobile terminal in response to assigning the user-drawn first gesture to the second function icon.

7. The method of claim 1, wherein the assigning step comprises:
assigning, via the controller, the user-drawn first input gesture to the displayed first function icon based on a predetermined position of the touchscreen where the user-drawn first input gesture is performed such that the first function is executed only when the user-drawn first input gesture is performed on the mobile terminal at the predetermined position of the touchscreen.

8. The method of claim 1, wherein when a second function is currently executing on the mobile terminal and the user-drawn first input gesture is performed on the mobile terminal, the method further comprises:
executing the first function and maintaining the execution of the second function; and
displaying first and second windows including the executing first and second functions in an overlapping manner.

9. A mobile terminal, comprising:
a housing forming an exterior of the mobile terminal;
an input unit equipped on the housing;
a touch screen equipped on the housing and configured to display at least one first function icon on a standby screen and receive a user-drawn first input gesture performed on the standby screen; and
a controller equipped within the housing and configured to control the touch screen and the input unit, wherein the controller is further configured to:
enter a touch gesture setting mode to allow a user to input the user-drawn first input gesture to be associated with the at least one first function icon,
assign the user-drawn first input gesture to the first function icon displayed on the standby screen such that a first function corresponding to the first function icon is to be executed when the user-drawn first input gesture is performed on the standby screen after assigning the user-drawn first input gesture to the first function icon,
remove the first function icon from the standby screen in response to assigning the user-drawn first input gesture to the first function icon, receive an input gesture on the standby screen,
execute the first function if the received input gesture on the standby screen matches the user-drawn first input gesture,
receive a canceling signal indicating the cancelation of the assignment of the user-drawn first input gesture to the first function icon,
cancel the assignment of the user-drawn first input gesture to the first function icon, and
re-display the first function icon on the standby screen in response to the cancelation of the gesture assignment,
wherein the first function icon is selectively displayed on the touch screen based on whether or not the user-drawn first input gesture is assigned to the first function icon.

10. The mobile terminal of claim 9, wherein the first function corresponding to the first function icon is a send function in a messaging mode.

11. The mobile terminal of claim 10, wherein the messaging mode includes one of a text messaging mode, a multimedia messaging mode and an email mode.

12. The mobile terminal of claim 9, wherein the user-drawn first input gesture corresponds to a check mark motion made on the mobile terminal.

13. The mobile terminal of claim 9, wherein the user-drawn first input gesture comprises one of a touch and drag operation performed on the touchscreen and a proximity touch action performed close to the mobile terminal without touching the touchscreen.

14. The mobile terminal of claim 9, wherein the controller is further configured to assign the user-drawn first input gesture to a second function icon corresponding to a second function such that both of the first and second functions are executed when the user-drawn first input gesture is performed on the mobile terminal, and to remove the second function icon from the touchscreen of the mobile terminal in response to assigning the user-drawn first gesture to the second function icon.

15. The mobile terminal of claim 9, wherein the controller is further configured to assign the user-drawn first input gesture to the displayed first function icon based on a predetermined position of the touchscreen where the user-drawn first input gesture is performed such that the first function is executed only when the user-drawn first input gesture is performed on the mobile terminal at the predetermined position of the touchscreen.

16. The mobile terminal of claim 9, wherein when a second function is currently executing on the mobile terminal and the user-drawn first input gesture is performed on the mobile terminal, the controller is further configured to execute the first function, to maintain the execution of the second function and to display first and second windows including the executing first and second functions in an overlapping manner.

17. The mobile terminal of claim 9, wherein the controller is further configured to enter the touch gesture setting mode responsive to at least one of a double touch operation, a long touch operation, or manipulation of a physical input key.

18. The mobile terminal of claim 9, wherein the controller is further configured, in the touch gesture setting mode, to display a storage icon upon completion of the user-drawn first input gesture, such that selection by the user of the storage icon completes assignment of the user-drawn first input gesture to the first function icon.

* * * * *